US012425494B2

(12) United States Patent
Cosentino et al.

(10) Patent No.: US 12,425,494 B2
(45) Date of Patent: Sep. 23, 2025

(54) ADAPTIVE COMPRESSION FOR IDEMPOTENT DATA STORES IN COMPUTER MESSAGING

(71) Applicant: Red Hat, Inc., Raleigh, NC (US)

(72) Inventors: Andrea Cosentino, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 560 days.

(21) Appl. No.: 17/876,095

(22) Filed: Jul. 28, 2022

(65) Prior Publication Data

US 2024/0040017 A1    Feb. 1, 2024

(51) Int. Cl.
*H04L 69/04*    (2022.01)
*G06F 16/22*    (2019.01)

(52) U.S. Cl.
CPC .......... *H04L 69/04* (2013.01); *G06F 16/2282* (2019.01); *H04L 2209/30* (2013.01)

(58) Field of Classification Search
CPC .................................................. H04L 2209/30
See application file for complete search history.

(56) References Cited

U.S. PATENT DOCUMENTS

| | | | |
|---|---|---|---|
| 7,933,962 B1 | 4/2011 | Banerjee et al. | |
| 8,150,806 B2 | 4/2012 | Boyd et al. | |
| 8,347,050 B2 | 1/2013 | Bernstein et al. | |
| 10,007,566 B1 | 6/2018 | Sweetland | |
| 10,656,972 B2 | 5/2020 | Agarwal et al. | |
| 11,178,197 B2 | 11/2021 | Ghare | |
| 12,200,086 B2 * | 1/2025 | Kamir | H03M 7/3073 |
| 2008/0098129 A1 * | 4/2008 | Niddam | H04L 69/161 |
| | | | 709/247 |

OTHER PUBLICATIONS

Ritter et al.; Patterns for Emerging Application Integration Scenarios; Mar. 13, 2017; 32 pgs.
Hicks; Clank: Architectural Support for Intermittent Computation; Proceedings of ISCA 2017; Jun. 24, 2017; 13 pgs; Association for Computing Machinery.

* cited by examiner

*Primary Examiner* — Pamit Kaur
(74) *Attorney, Agent, or Firm* — Kilpatrick Townsend & Stockton LLP

(57) ABSTRACT

Systems and methods for adaptive compression for idempotent data stores in computer messaging are generally described. In some examples, a first node may receive a first message that includes a first message identifier and first payload data. In some examples, the first node may determine that a respective available amount of storage of each node of a plurality of nodes is below a first threshold available amount of storage. In some cases, the plurality of nodes may include the first node. The first node may receive a compression key from a primary node of a cluster including the plurality of nodes. The first node may compress a second message identifier stored in a data structure of the first node using the compression key.

20 Claims, 7 Drawing Sheets

ADAPTIVE COMPRESSION FOR IDEMPOTENT DATA STORES IN COMPUTER MESSAGING

BACKGROUND

The present disclosure generally relates to messaging protocols used in computer communication systems. For example, Representational State Transfer (REST) APIs use the synchronous paradigm of communication, where a message is sent and a response is waited for before making a new request. REST API calls are often referred to as "synchronous" API calls indicating that code execution and user interaction is stopped until the call returns the requested information. Other messaging architectures may be asynchronous, as code execution and/or user interaction need not stop to wait for the response. Event-driven architectures (EDAs) employ asynchronous communication. In EDAs, messages are sent by a "publisher" (an entity generating the data) to a message broker. The message broker may be infrastructure that stores the message and delivers the message to "subscribers" (applications that have registered to receive the particular message from the particular publisher). Various techniques described herein may refer to messaging protocols generally—whether synchronous or asynchronous.

SUMMARY

The present disclosure provides a new and innovative system, methods and apparatus for adaptive compression for idempotent data stores in computer messaging. In an example, a first node may receive a first message including a first message identifier and first payload data. A determination may be made that a respective available amount of storage of each node of a plurality of nodes is below a first threshold available amount of storage. In some examples, the plurality of nodes may include the first node. In various examples, a compression key may be received from a primary node of a cluster that includes the plurality of nodes. In some cases, a second message identifier that is stored in a data structure of the first node may be compressed using the compression key.

In another example, a system that may be configured to provide adaptive compression for idempotent data stores in computer messaging is generally described. In some examples, the system may include a cluster of compute nodes. The cluster of compute nodes may include a first node and a primary node. The first node may be effective to receive a first message including a first message identifier and first payload data. The first node may be further effective to determine that a respective available amount of storage of each node of a plurality of nodes of the cluster of compute nodes is below a first threshold available amount of storage. The plurality of nodes may include the first node. In various examples, the first node may be effective to receive, from the primary node, a compression key. In various examples, the first node may be further effective to compress a second message identifier stored in a data structure of the first node using the compression key.

In some examples, a non-transitory machine-readable medium may store a program that, when executed by at least one processor, may be effective to receive, by a first node, a first message comprising a first message identifier and first payload data. In some cases the program may be further effective to determine that a respective available amount of storage of each node of a plurality of nodes is below a first threshold available amount of storage. In some examples, the plurality of nodes may include the first node. In some cases, the program may receive from a primary node of a cluster comprising the plurality of nodes a compression key. In various cases, the program may compress a second message identifier stored in a data structure of the first node using the compression key.

Additional features and advantages of the disclosed methods, devices, and/or systems are described in, and will be apparent from, the following Detailed Description and the Figures.

DETAILED DESCRIPTION OF EXAMPLE EMBODIMENTS

Figure 1:
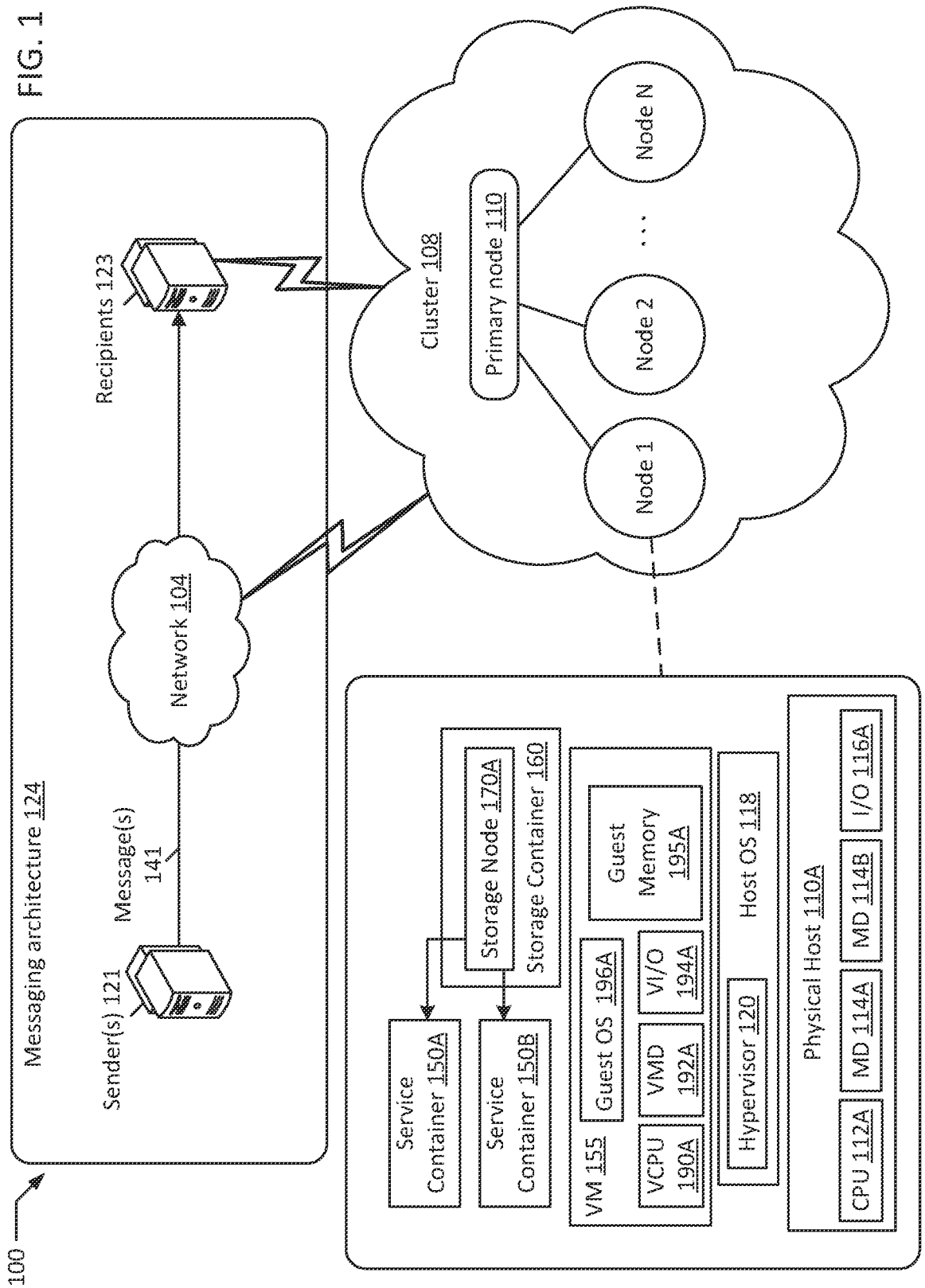
FIG. 1 is a block diagram of a computer messaging architecture, according to various examples of the present disclosure.

Many applications and/or compute systems communicate using message architectures, wherein messages of an agreed-upon and/or changing format are sent between senders and receivers. Typically, a sender sends a message that is then "consumed" by a recipient device. The particular action taken in response to receipt of a message depends on the ingesting device and/or software as well as on the content of the message (e.g., the payload of the message). For example, a message may indicate a current temperature of a temperature sensor. A different message may indicate that a vehicle has passed through an intersection that is monitored by a sensor, etc. In some cases, duplicate messages may be received by a particular recipient device even when the message was only generated and/or sent a single time by the sender. This may happen due to different routing architectures that may duplicate and/or reroute a particular message. For example, sender device A may send a single message to recipient devices B and C. However, a program executing at recipient device B may cause the message to be forwarded to recipient device C. Accordingly, recipient device C may receive two copies of the same message.

In many cases, this may not cause any issue. For example, the payload of the message may indicate a current temperature and the recipient may write the temperature value into a field of a data structure in memory. In such a case, the same temperature may be written a first time and then, when the duplicate of the message is received, the temperature value may be used to overwrite the duplicate value. Assuming that these two duplicate temperature value messages are received close in time to one another, this may not cause a problem. However, in other cases, receipt of duplicate messages may cause an issue. For example, in the traffic monitoring example described above, if a duplicate message is received, a counter may be updated to indicate that two vehicles pass through the monitored intersection instead of only a single vehicle, resulting in an inaccurate tally which may, in turn, have serious consequences (e.g., changing a traffic light cycle based on the inaccurate tally which could lead to serious traffic congestion).

Additionally, parsing and/or performing operations in response to duplicate, redundant messages may consume additional compute resources (e.g., in terms of processor cycles, memory resources, and/or power). This may be especially problematic for edge computing devices which may be resource constrained. For example, edge computing devices may have minimal processing capability, may have limited bandwidth, and/or may be battery powered. In such edge computing devices, performing unnecessary actions due to the receipt (or generating and/or sending) of duplicate messages may cause the battery-life to be drained more quickly and/or may cause increased CPU usage. Edge computing is described in additional detail below.

Accordingly, in various examples, it may be desirable to detect and avoid consumption of duplicate messages in a computer messaging architecture. The term "idempotent" is used in mathematics to describe a function that produces the same result if it is applied to itself (i.e. $f(x)=f(f(x))$). In computer messaging, this concept translates into a message that has the same effect whether it is received once or multiple times. This means that a message can safely be re-sent without causing any problems even if the recipient device receives duplicates of the same message. Described herein are systems and techniques that may be used to instantiate an idempotent data store that detects duplicate messages among a cluster of compute nodes and acts as a filter so that duplicate messages are not consumed (e.g., the payload is not parsed and/or is not used by the recipient). In various examples, messages may include message identifiers (e.g., data (e.g., numeric data) that uniquely identifies the message from among other messages) and payload data (e.g., the contents of the message). The idempotent data store may be used to store message identifiers. Accordingly, when a new message is received, the idempotent data store (which may be distributed) may be consulted to determine if the message identifier of the new message is currently stored in the idempotent data store. If so, the message may be determined to be a duplicate and the message may be discarded (e.g., instructions may be sent to the recipient device (e.g., the addressee of the message) to instruct the recipient device to discard the message without ingesting any of the payload data). In other examples, the message may be intercepted by an idempotent service prior to receipt by the recipient device and may be filtered out (e.g., the message may be prevented from being sent to the recipient device) if the message identifier is already stored in the idempotent data store.

Additionally, the various systems and techniques described herein may use adaptive compression techniques and compute-resource-based logic to determine when to compress entries of the idempotent data store and/or to determine which node should store a new entry (e.g., a new message identifier). The amount of data left by each node of the distributed idempotent data store and/or the battery life of each node may be used to determine which node should store a new message identifier (e.g., a message identifier that is not presently stored by the idempotent data store) and/or whether compression/decompression should be applied to one or more entries in the idempotent data store, as described in further detail below. The various techniques described herein offer compute performance enhancements by reducing the number of processor cycles allocated to redundant operations and reducing the amount of memory consumption. Such techniques may be particularly useful in resource-constrained devices such as battery-powered edge devices (e.g., sensors and/or other network edge devices).

In edge computing systems, computing resources are often provisioned at different tiers and at different geographically distributed nodes. In such systems, it may be advantageous to deploy different compute resources at different hierarchical levels of the edge network in order to optimize compute footprint and/or performance. Deployment of compute services across multiple clusters in an edge network may allow for more efficient use of compute resources and may provide better service and/or lower latency relative to deployment within a single, centralized cluster. However, devices that are positioned at the edge of such systems—so-called "edge" devices—far from the data centers of the architectures are often resource-constrained devices. For example, edge computing devices may include battery-powered sensors, internet-of-things devices that include minimal computing hardware, etc. Minimization of compute load and/or power consumption by such devices is often highly prioritized. Accordingly, use of the various techniques described herein for updating and/or determining message format data may reduce power consumption, message size, latency, and/or CPU usage.

Examples of messaging architectures include asynchronous Event-driven architectures (EDAs) as well as synchronous messaging protocols. The various techniques described herein for modifying and/or determining message data formats may be used in any messaging protocol. In EDAs, entities generating data are referred to as "publishers," while the recipients/consumers of such data are referred to as "subscribers." Communication in EDAs is referred to as asynchronous because a publisher need not wait for a response from any subscribers prior to generating/publishing additional data. By contrast, in a synchronous messaging architecture such as those provided by REST APIs, a sender waits for a response from a recipient prior to sending additional data.

EDAs typically employ infrastructure called a "message broker" that receives messages (data) from publishers and delivers the messages to subscribers that have registered to receive such messages. Examples of message brokers include RabbitMQ, Apache Kafka, JBoss Messaging, Solace, etc. Accordingly, publishers may be data generating software/hardware that sends messages to the message broker. For example, a publisher may be a smart thermostat that sends temperature data to a message broker, a social media network that sends new subscriber data to a message broker, a smart refrigerator that sends data regarding food stored in the refrigerator to a message broker, etc. Publishers may be any type of application and/or embedded systems that generate and send data using an EDA. Subscribers may be applications that connect to the message broker, manifest an interest in a certain type of message (e.g., messages assigned to a particular "topic"), and maintains the connection with the message broker so that the message broker is able to push the messages to the subscriber. The recipients and recipient devices referred to herein may be subscribers. Various other messaging protocols may send messages directly from a sender device to a receiver device in a point-to-point fashion without intermediary devices.

Messages are data that are sent between two devices and/or applications. For example, messages may be sent from a sender device to a receiver device. In another example, messages may be sent by publishers to a message broker, and then pushed by the message broker to the relevant subscribers (e.g., receivers). The content of messages can be any data. Such messages are often described as events or commands. Events communicate a fact (e.g., a temperature detected by the thermostat), while commands provide executable instructions to cause the subscriber application to take a particular action. Messages may include message identifiers (e.g., identifier data) that may be used to uniquely identify a particular message.

Messages may be sent from senders using a variety of different protocols. Examples of such protocols may include, but are not limited to, message queuing telemetry transport (MQTT), constrained application protocol (CoAP), advanced message queuing protocol (AMQP), hypertext transfer protocol (HTTP), etc. Accordingly, asynchronous application programming interfaces (APIs) (e.g., AsyncAPI) may be similar to synchronous APIs (e.g., OpenAPI), but may include different data formats. In various illustrative examples used herein, EDAs are described. However, the various data format modification and/or identification techniques described herein are applicable to any messaging architecture, whether synchronous or asynchronous.

FIG. 1 is a block diagram of a system 100 comprising a computer messaging architecture 124, according to various examples of the present disclosure. The messaging architecture 124 may be implemented using software, hardware, and/or some combination thereof. In various examples, the messaging architecture 124 may include one or more senders 121 and one or more recipients 123 (e.g., recipient devices). The senders 121 may be hardware and/or software (e.g., applications) that may send messages via network 104 to the recipients 123. FIG. 1 depicts example components that may be included in various implementations of senders 121 and/or recipients 123. For example, senders 121 and/or recipients 123 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 155, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 155). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 155 may be a VM executing on physical host 110A.

Senders 121 and/or recipients 123 may run one or more VMs (e.g., VMs 155), by executing a software layer (e.g., hypervisor 120) above the hardware and below the VM 155, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 155 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 155 may be a virtual machine and may execute a guest operating system 196A which may utilize the underlying VCPU 190A, VMD 192A, and VI/O 194A. Processor virtualization may be implemented by the hypervisor 120 scheduling time slots on physical CPUs 112A such that from the guest operating system's perspective those time slots are scheduled on a virtual processor 190A. VM 155 may run on any type of dependent, independent, compatible, and/or incompatible applications on the underlying hardware and host operating system 118. The hypervisor 120 may manage memory for the host operating system 118 as well as memory allocated to the VM 155 and guest operating system 196A such as guest memory 195A provided to guest OS 196A. In an example, storage container 160 and/or service containers 150A, 150B are similarly implemented.

In an example, in addition to distributed storage provided by storage container 160, storage controller 142 may additionally manage storage in dedicated storage nodes (e.g., NAS, SAN, etc.). In an example, storage controller 142 may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to orchestrator 140. In the example, storage controller 142 may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (e.g., including cluster 108).

The various virtualized computing systems (e.g., service containers 150A, 150B, VM 155) may be examples of computing environments that may deploy one or more of the techniques described herein for a distributed, idempotent data store for computer messaging (e.g., a distributed cache that may store message identifiers, as described herein). For example, service container 150A may be a cache (or other memory) that may store message identifiers of received messages 141. Service container 150B may include a different cache that may be part of the distributed, idempotent data store. Additionally, the other nodes (e.g., Node 2, ..., Node N) may include memory that constitutes all or a portion of the distributed, idempotent data store(s) described herein. Upon receipt of a new message 141, the idempotent data store may be consulted to determine if the message identifier of the received message 141 is presently stored in the idempotent repository. If so, the message may be discarded prior to consumption of the payload. In some examples, if the message identifier is not stored, a determination may be made (e.g., using a priority table related to the idempotent service) of a node that has the most available memory. The message identifier may be sent to that node for storage. In various further examples, if a determination is made that no node of the idempotent service has sufficient memory, a signal may be sent to primary node 110. The primary node 110 may respond by sending a compression key (e.g., a cryptographic key that may be used to compress data) to each of the nodes (e.g., Node 1, Node 2, ..., Node N) of the idempotent service together with instructions to compress one or more message identifiers stored by the nodes. Later, as the message identifiers are evicted from the idempotent data store and the individual nodes have more available memory, the primary node 110 may send decompression instructions (and/or a decompression key if asymmetric encryption is used) to the nodes to have the nodes decompress the compressed message identifiers (to reduce latency of the idempotent service). The various techniques used for adaptive compression of the distributed, idempotent repository are described in further detail below.

Figure 2:
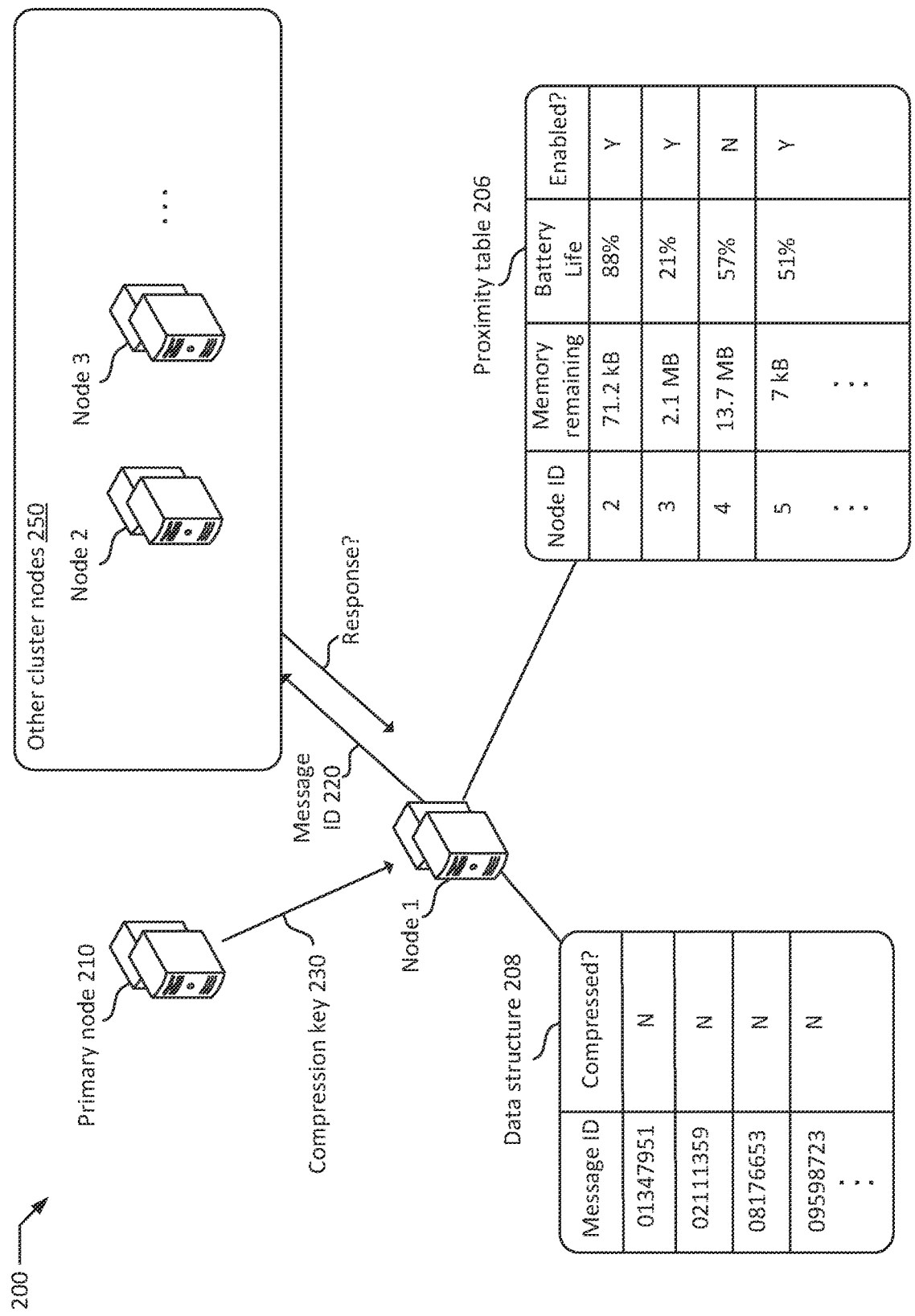
FIG. 2 is a block diagram illustrating adaptive compression of a distributed, idempotent data store for a computer-messaging architecture, according to various examples of the present disclosure.

FIG. 2 is a block diagram 200 illustrating adaptive compression of a distributed, idempotent data store (e.g., data structure 208) for a computer-messaging architecture, according to various examples of the present disclosure.

Node 1 may join a pool of distributed nodes (e.g., a cluster of nodes comprising primary node 210, Node 1, Node 2, Node 3, etc.). Node 1 may join the idempotent service. For example, Node 1 may send a message to all other nodes in the cluster that are within a distance defined by a maximum threshold. For example, Node 1 may send a message to all "level 1" neighbors of Node 1 (as defined by the global configuration of the cluster) indicating that Node 1 is joining the idempotent service. In response, each node receiving the message from Node 1 may send a response that indicates that node's i) remaining amount of storage; ii) remaining battery life (if applicable); iii) node identifier; and iv) status (enabled or disabled with respect to the idempotent service). In response to receipt of this information from the other level 1 nodes (or other nodes within the distance threshold in the cluster), Node 1 may generate proximity table 206. As shown, the proximity table may include a Node ID field, a memory remaining field, a battery life field, and an enabled status field. After generating the proximity table 206, the newly-joined node (Node 1) may send the same data to the other nodes in the proximity table 206 so that the other nodes in the idempotent service may update their respective proximity tables with information about Node 1. Node 1 may set its status to "enabled."

Node 1 (or any other node of the idempotent service) may thereafter receive a message. In some examples, node 1 may be the addressee of the message. However, in other examples, Node 1 may simply be part of the idempotent service that is evaluating the message to determine if the message is a duplicate prior to forwarding the message to the addressee/recipient (in the case that the received message is not a duplicate). In the example of FIG. 2, Node 1 and/or one or more other nodes (e.g., Node 2, Node 3, ..., of the other cluster nodes 250, and/or primary node 210) may implement the idempotent service and may filter out duplicate messages.

The node receiving the message (e.g., Node 1) may extract the message identifier (e.g., message ID 220) from the received message. The node may search its local data structure 208 to determine if the message ID is stored therein. If so, the message may be discarded (e.g., filtered out) without ingesting the payload data of the message. If not, the node may broadcast the message ID 220 to each other node (e.g., the other cluster nodes 250). Each node may search its local data store (e.g., its local portion of the distributed idempotent data store) to determine if the message ID 220 is stored therein. If so, the node may respond accordingly and the message may be dropped without further action. Conversely, if no node answers (and/or each nodes answers indicating that the message ID 220 is not stored by that node), a determination may be made that the message ID 220 is associated with a new message (e.g., a message that has not previously been received). In this example, Node 1 may check its amount of available memory and may compare this amount of available memory to a low_memory_threshold. If the amount of available memory is above the low_memory_threshold, Node 1 may store the message ID 220 in the data structure 208. Conversely, if the amount of available memory of Node 1 is below the low_memory_threshold, Node 1 may consult the proximity table 206 to determine the node with the greatest amount of memory remaining.

In the example of FIG. 2, Node 4 has 13.7 MB available. However, Node 4 is marked as non-enabled. Accordingly, no action is taken with respect to Node 4. Nodde 3 has 2.1 MB of memory remaining, the most among enabled nodes in proximity table 206. Accordingly, Node 1 may send the message ID 220 to Node 3 with instructions to store message ID 220 in the portion of the distributed, idempotent data structure maintained by Node 3. If a confirmation is received by Node 1 from Node 3 indicating that the message ID 220 has been stored by Node 3, Node 1 may update proximity table 206 to reflect updated memory remaining and/or battery life for Node 3. For example, Node 3 may provide this information in the confirmation. If no answer is received from Node 3 or a negative answer is received from Node 3 indicating that Node 3 could not store the message ID 220, Node 1 may send the message ID 220 to the node with the next highest amount of available memory along with instructions to store the message ID 220. For example, Node 2 has 71.2 kB remaining which is the next-highest amount of available memory after Nodes 4 and 3. Accordingly, Node 1 may send instructions to Node 2 to store the message ID 220. In various examples, Node 1 may send instructions to a particular node to store a new message ID only if the nodes remaining battery life is above a battery life threshold (to ensure that the idempotent table is maintained by nodes with a sufficient amount of battery life).

If no node identified in the proximity table 206 confirms that it is able to store the new message ID (e.g., message ID 220), Node 1 may send indicator data to the primary node 210 indicating that no node was able to store a new message identifier. In addition, the indicator data may identify each node in the idempotent service. In response, the primary node 210 may send a compression key 230 and/or compression instructions to each node of the idempotent service (e.g., Nodes 1, 2, 3, . . . ). The compression key 230 and/or the compression instructions may be used to compress message identifier data stored in the distributed, idempotent data stores. In other words, each node of the idempotent service may use the compression key to compress all message IDs currently stored by that node to increase the available amount of memory. Additionally, each node may set a compression flag (e.g., compression=Y) for each compressed message ID indicating that the message ID is in compressed format. Upon completion of the compression operation, each node may send an updated available amount of memory and/or battery life information to each node in its proximity table. Upon receipt of such information, each node may update its proximity table to indicate the most recent memory remaining and/or battery life of each node. The primary node 210 may send data (e.g., a ping) back to the node invoking compression to inform the node that compression has been completed. Additionally, in some examples, the primary node 210 may store a list of compressed nodes (e.g., in association with the relevant compression key) in the cluster. Thereafter, Node 1 may store the message ID 220 (since Node 1 may now have sufficient memory post compression). Further, after compression other nodes should have more available memory as well and should be able to store message identifiers for an additional amount of time (e.g., during a peak in network traffic).

On a defined time window (e.g., periodically, semi-periodically, at a time determined by available network bandwidth, latency, etc.), the primary node 210 may broadcast a message to the stored list of compressed nodes to request the available amount of memory and/or battery life of each of these nodes. If each node has an available amount of memory that is above a high_memory_threshold (or above the low_memory_threshold in a single threshold implementation) and each node has an amount of battery life remaining that is above a battery life threshold, the primary node 210 may invoke a decompression action on each node stored in the list of compressed nodes. For example, the primary node 210 may send decompression instructions to each compressed node. Each compressed node may decompress their respective portions of the distributed, idempotent data store using the original compression key (or a new asymmetric decompression key). Additionally, each node may thereafter set its compression flag for decompressed entries to false. Conversely, if any nodes still do not have an available amount of memory that is above the relevant threshold, the primary node 210 may take no action and may wait for the next time window to get information about the nodes' remaining battery life/amount of available memory.

Figure 3:
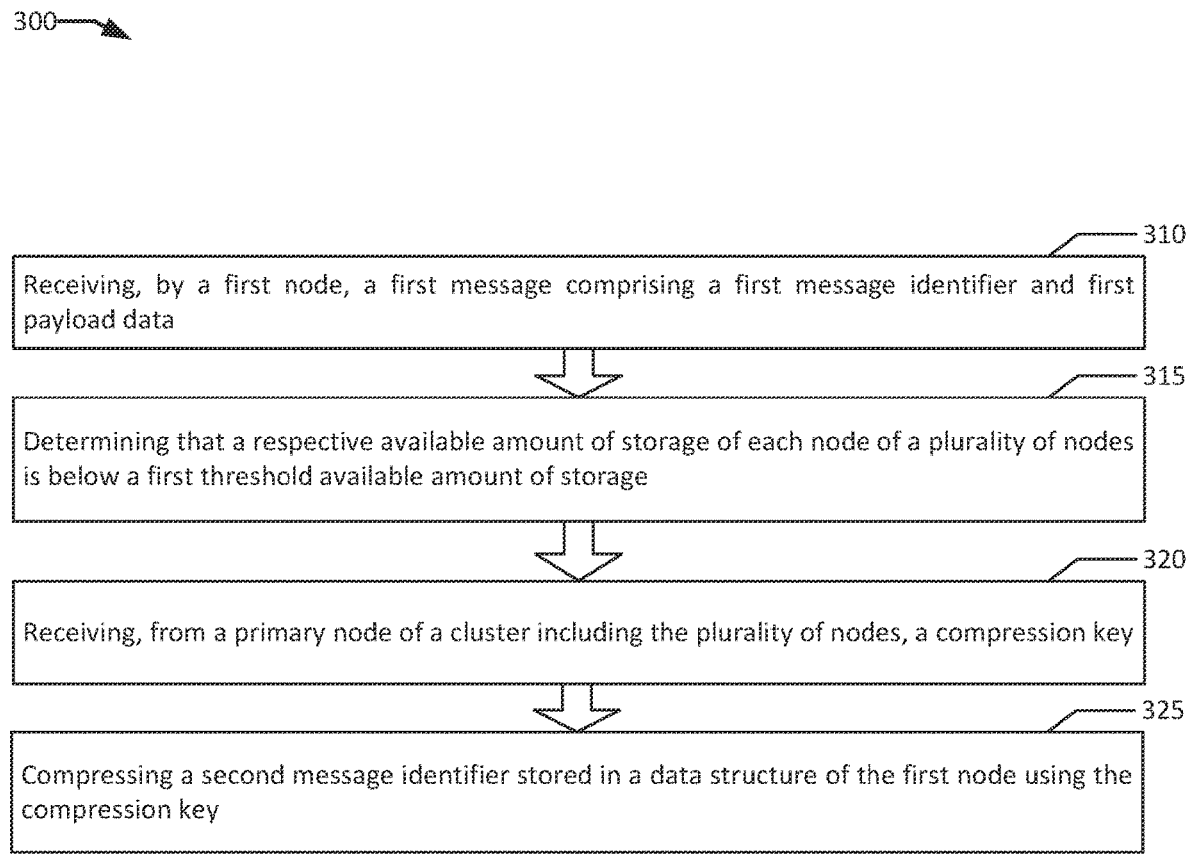
FIG. 3 is flowchart illustrating an example process for adaptive compression for idempotent data stores in computer messaging according to an example of the present disclosure.

FIG. 3 is flowchart illustrating an example process 300 for adaptive compression for idempotent data stores in computer messaging according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes receiving, by a first node, a first message comprising a first message identifier and first payload data (block 310). The first message may either be received by a recipient device that is part of the idempotent service described herein or may be sent to a device of an idempotent service prior to sending the first message to the recipient device (in order to determine if the first message is a redundant message or not).

The example process 300 may further include determining that a respective available amount of storage of each node of a plurality of nodes is below a first threshold available amount of storage (block 315). For example, the first node may determine that the first message identifier is not stored in a local portion of the idempotent data store. Accordingly, the first node may broadcast the first message identifier to the plurality of nodes that are set to enabled in the first node's priority table (e.g., proximity table 206). If no responses are received (e.g., greater than or equal to a threshold amount of time has elapsed since broadcasting the first message identifier), the first node may determine that the first message identifier is not currently stored in the distributed, idempotent data store of the idempotent service and may thus conclude that the message is a new, non-redundant message. The first node may determine whether the first message identifier may be stored locally in memory of the first node. However, in some cases, there may be insufficient available memory at the first node (e.g., the available amount of memory for the first node may be below a low memory threshold). In such cases, the first node may consult the priority table to determine the respective available amount of storage of each node of the plurality of nodes in the priority table. However, if each node in the priority table has an amount of available memory that is below the relevant memory threshold and/or either does not respond to a request from the first node to store the first message identifier or does not respond to the request to store the first message identifier within a relevant timeout period, the first node may send data to the primary node 210 requesting compression. The first node may provide the list of nodes in the priority table (e.g., proximity table 206) to the primary node 210.

The example process 300 may further include receiving, from a primary node of a cluster including the plurality of nodes, a compression key (block 320). The primary node 210 may send the compression key to each node in the list sent by the first node along with instructions to compress their currently-stored message identifiers using the compression key (and a compression algorithm). Each of the plurality of nodes may thereafter compress their stored message identifiers in the distributed, idempotent data store and set the compressed flag for each compressed message identifier to true. The example process 300 may further include compressing a second message identifier stored in a data structure of the first node using the compression key (block 325). After compression, each node may send the currently available amount of memory and the current remaining battery life to each node in its proximity table. Each node may update its proximity table based on the received available memory and/or battery life information. The primary node 210 may periodically request the remaining amount of available memory and/or the remaining battery life from each node in the list of nodes received by the primary node 210. If the primary node 210 determines that the amount of available memory of each of the nodes in the list of nodes is above a relevant memory threshold, the primary node 210 may send instructions to decompress the compressed message identifiers stored by each node (e.g., using the previously-sent compression key or another decompression key depending on the particular compression algorithm being used). In various examples, the amount of available memory of the nodes may increase over time as entries in the distributed, idempotent data store may become stale (e.g., time to live (TTL) values associated with the message identifier entries may expire and/or greater than a threshold amount of time may pass) and may be evicted from the nodes' data stores.

Figure 4A:
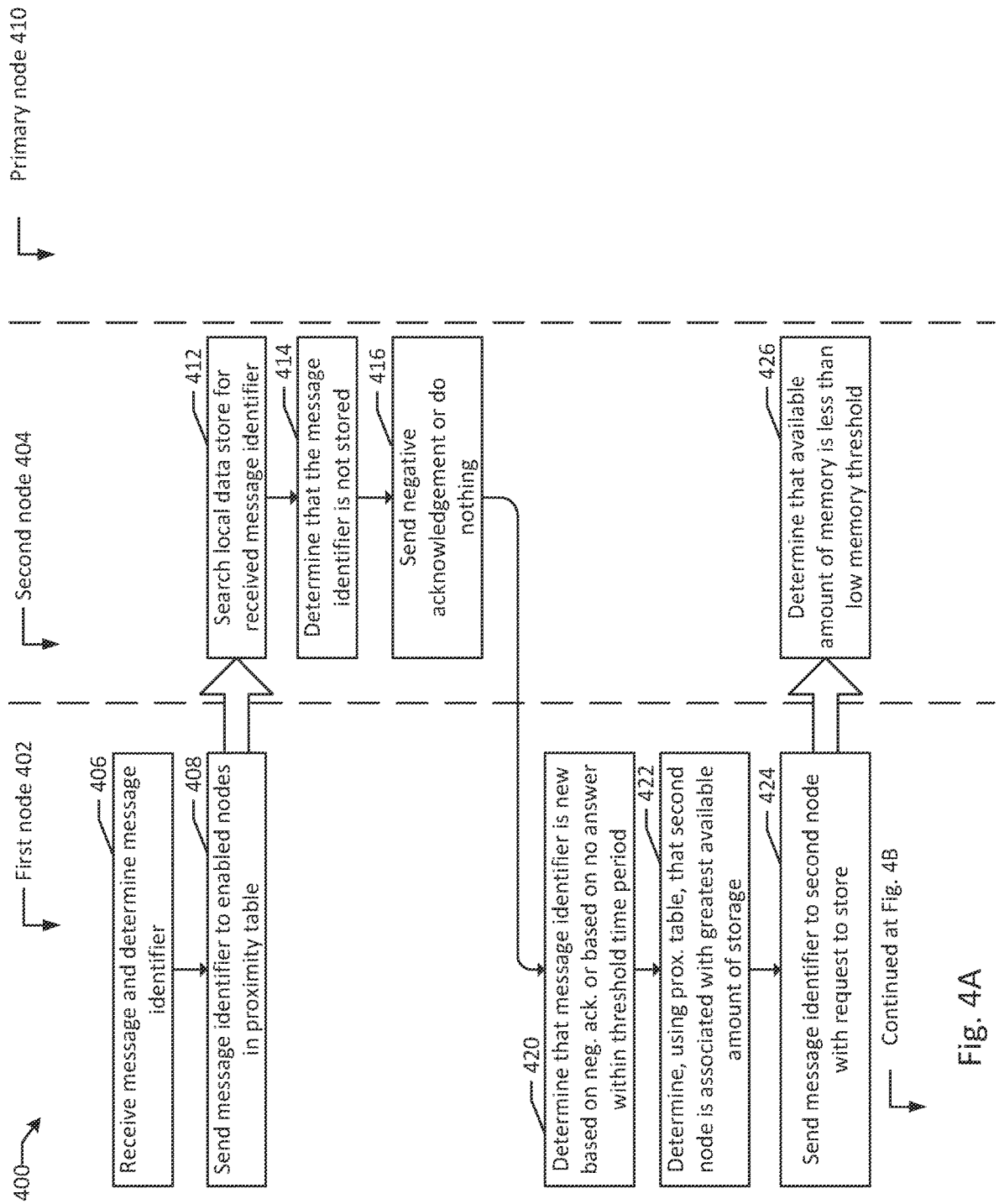
FIGS. 4A, 4B, and 4C illustrate a flow diagram of another example of adaptive compression of a distributed, idempotent data store between a first node, a second node, and a primary node of a cluster of compute nodes, according to various aspects of the present disclosure.
Figure 4B:
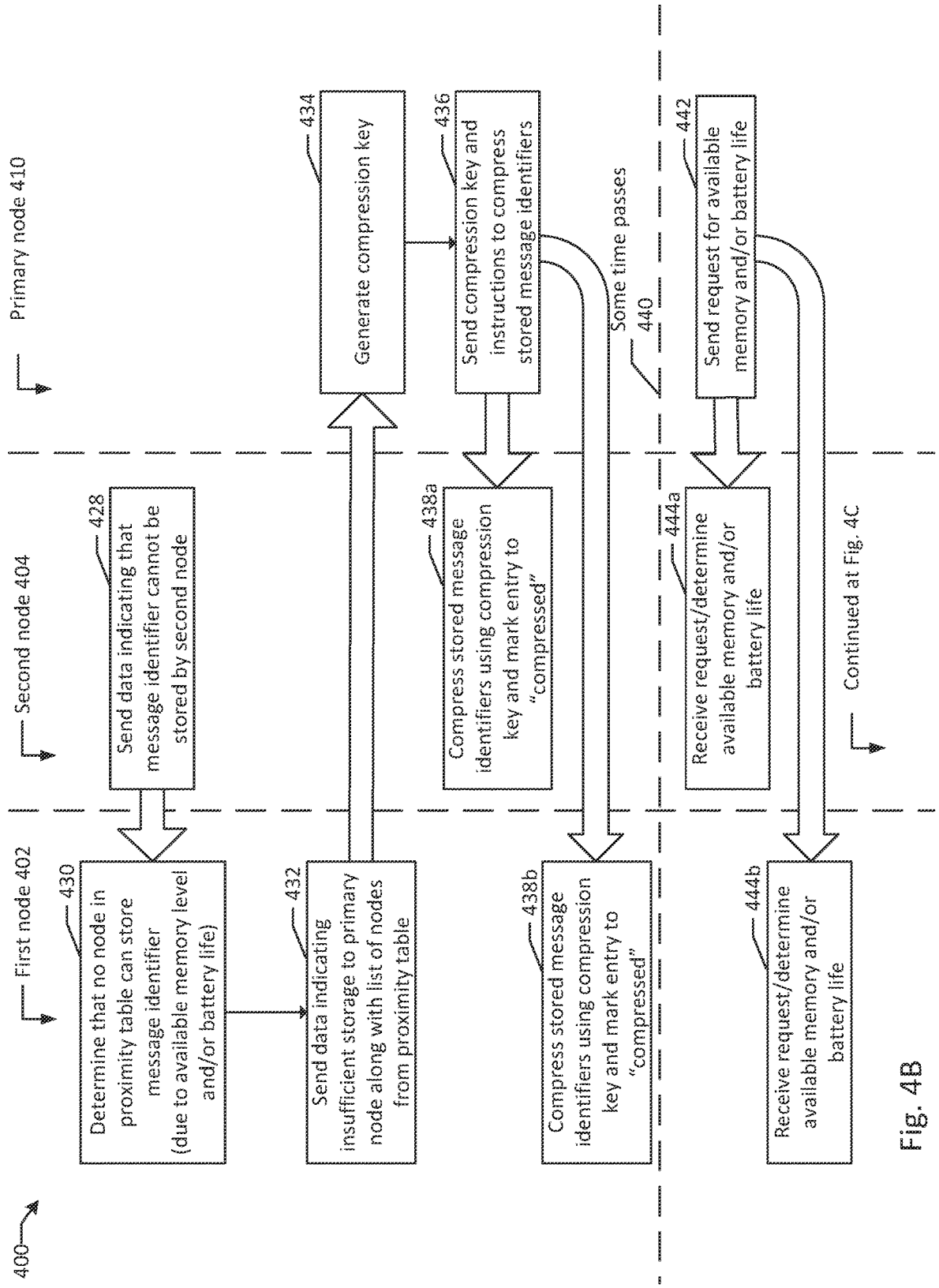
Figure 4C:
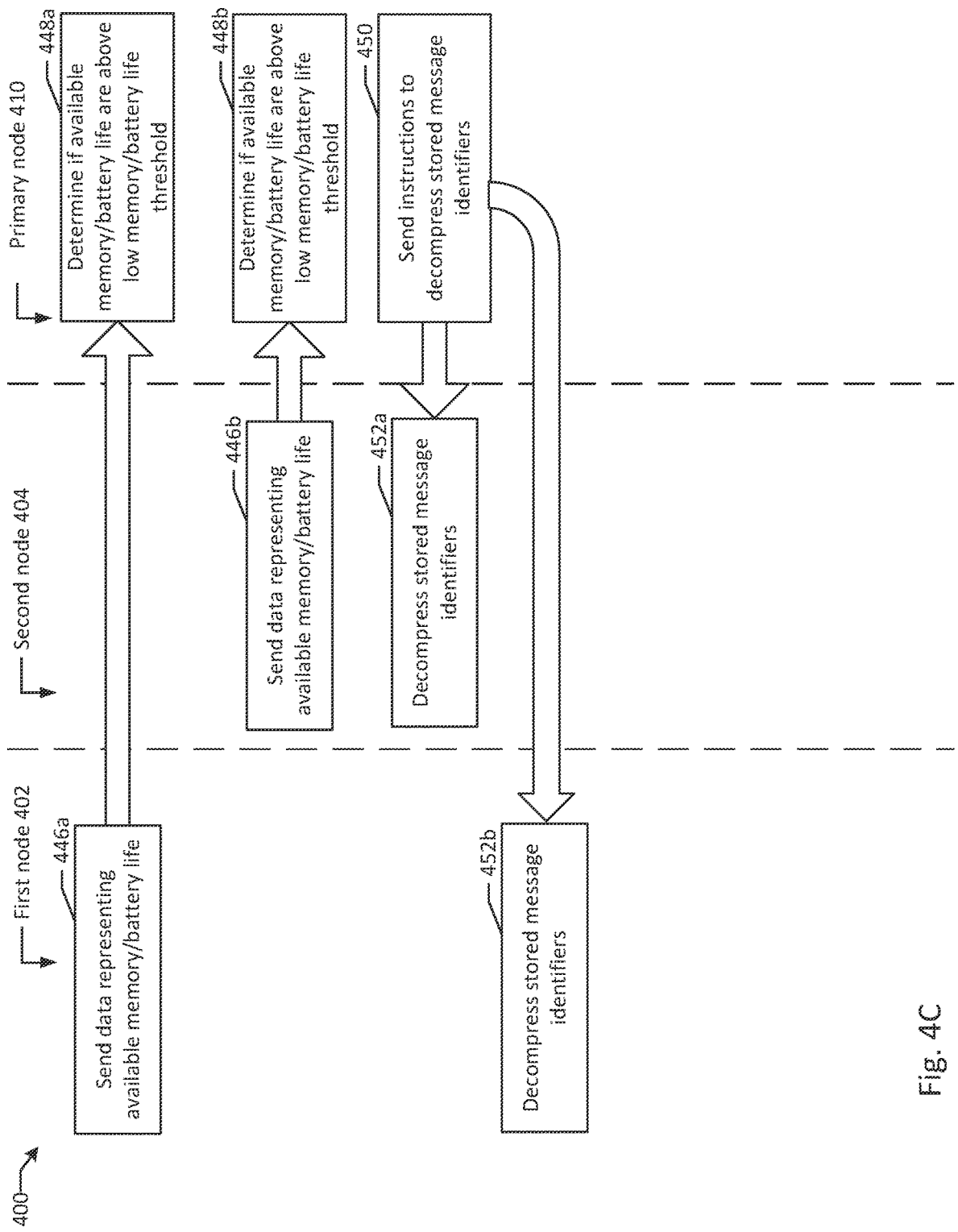

FIGS. 4A, 4B, and 4C illustrate a flow diagram of another example process 400 for adaptive compression of a distributed, idempotent data store between a first node, a second node, and a primary node of a cluster of compute nodes, according to various aspects of the present disclosure. Although the example process 400 is described with reference to the flowchart illustrated in FIGS. 4A, 4B, and 4C, it will be appreciated that many other methods of performing the acts associated with the process 400 may be used. For example, the order of some of the blocks may be changed, certain blocks may be combined with other blocks, blocks may be repeated, and some of the blocks described may be optional. The process 400 may be performed by processing logic that may comprise hardware (circuitry, dedicated logic, etc.), software, or a combination of both. In some examples, the actions described in the blocks of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 400 includes receiving, by a first node 402, a message and determining the message identifier for the message (block 406). The first node 402 may send the message identifier to enabled nodes in the proximity table of the first node 402 (block 408). For example, the first node 402 may determine a second node 404 that is represented in the proximity table of the first node 402 and which is indicated as being enabled. The first node 402 may send the message identifier to the second node 404. The second node 404 may search its local data store for the received message identifier (block 412). Upon determining that the message identifier is not stored in the local portion of the distributed, idempotent data store (block 414), the second node 404 may send a negative acknowledgement to the first node 402 (block 416). In some implementations, the second node 404 may, instead, take no action in response to determining that the message identifier is not stored in its local data store.

The first node 402 may determine that the message identifier is new based on either a negative acknowledgement received from each node in its proximity table (or based on receiving no response from each node within a threshold time period) (block 420). The first node 402 may determine, using its proximity table, that the second node 404 is associated with the greatest available amount of storage from among nodes in the idempotent service (e.g., enabled nodes in the first node's proximity table) (block 422). The first node 402 may send the message identifier to the second node 404 with a request to store the message identifier (block 424) in response to the second node 404 showing the greatest amount of available memory in the first node 402's proximity table. The second node 404 may receive the message identifier and/or the request to store the message identifier and may determine that the available amount of memory of the second node 404 is less than a low memory threshold (block 426).

Process 400 may continue at FIG. 4B and second node 404 may send data indicating that the message identifier cannot be stored by the second node (block 428). The first node 402 may receive the data from the second node 404 and may determine based on the data (and based on similar data sent by other enabled nodes represented in the proximity table) that no node in the proximity table can store the message identifier (e.g., due to available memory levels and/or battery life of these nodes being below applicable threshold values) (block 430). The first node 402 may send data indicating insufficient storage (of all enabled nodes in the proximity table) to the primary node 410 along with the list of enabled nodes in the proximity table (block 432). The primary node 410 may receive the data and may generate a compression key in response (block 434). The primary node 410 may send the compression key and instructions to compress stored message identifiers to each node in the list of nodes (e.g., including first node 402 and second node 404) (block 436). Accordingly, at block 438a, the second node 404 may compress stored message identifiers in its local portion of the distributed, idempotent data store using the compression key. Each compressed entry (e.g., each compressed message identifier entry) may be designated as "compressed" in the local portion of the distributed, idempotent data store.

Similarly, at block 438b, the first node 402 may compress stored message identifiers in its local portion of the distributed, idempotent data store using the compression key. Each compressed entry (e.g., each compressed message identifier entry) may be designated as "compressed" in the local portion of the distributed, idempotent data store. It should be noted that blocks 438*a* and 438*b* may occur in parallel and/or upon receipt of the compression key and compression instructions.

After some time passes (dashed line 440), the primary node 410 may send a request to each node in the list for available memory and/or battery life (block 442). Accordingly, second node 404 may receive the request and may determine available memory and/or battery life (block 444*a*). Similarly, first node 402 may receive the request and may determine available memory and/or battery life (block 444*b*). The operations of blocks 444*a* and 444*b* may occur in parallel and/or upon receipt of the request sent by the primary node 410 at block 442.

Process 400 may continue at FIG. 4C, at which first node 402 may send data representing its available amount of memory and/or battery life to the primary node (block 446*a*). Similarly, second node 404 may send data representing its available amount of memory and/or battery life to the primary node (block 446*b*). Primary node 410 may determine if the available amount of memory/battery life received from each node is above applicable low memory and/or low battery life thresholds (blocks 448*a*, 448*b*). If the available amount of memory of each node of the list is above the low memory threshold and/or the amount of remaining battery life of each node of the list is above the low battery life threshold, primary node 410 may send instructions to decompress the compressed, stored message identifiers (block 450). In some examples, if asymmetric compression keys are used, the primary node 410 may send a decompression key to the nodes of the list.

The first node 402 and the second node 404 may each receive the instructions to decompress the stored, compressed message identifiers and may decompress the message identifiers that are stored locally in each node's respective portion of the distributed, idempotent data store (blocks 452*a*, 452*b*). Additionally, the compression flag for each decompressed entry may be set to false. Compressing the message identifiers stored in the distributed, idempotent data store may optimize for memory usage over latency during high message traffic periods. Additionally, latency may be incurred as the message identifiers are decompressed prior to determining if they match a received message identifier (and thus that the received message is redundant). Conversely, the decompressed message identifiers may optimize for less latency at the expense of greater memory requirements.

Figure 5:
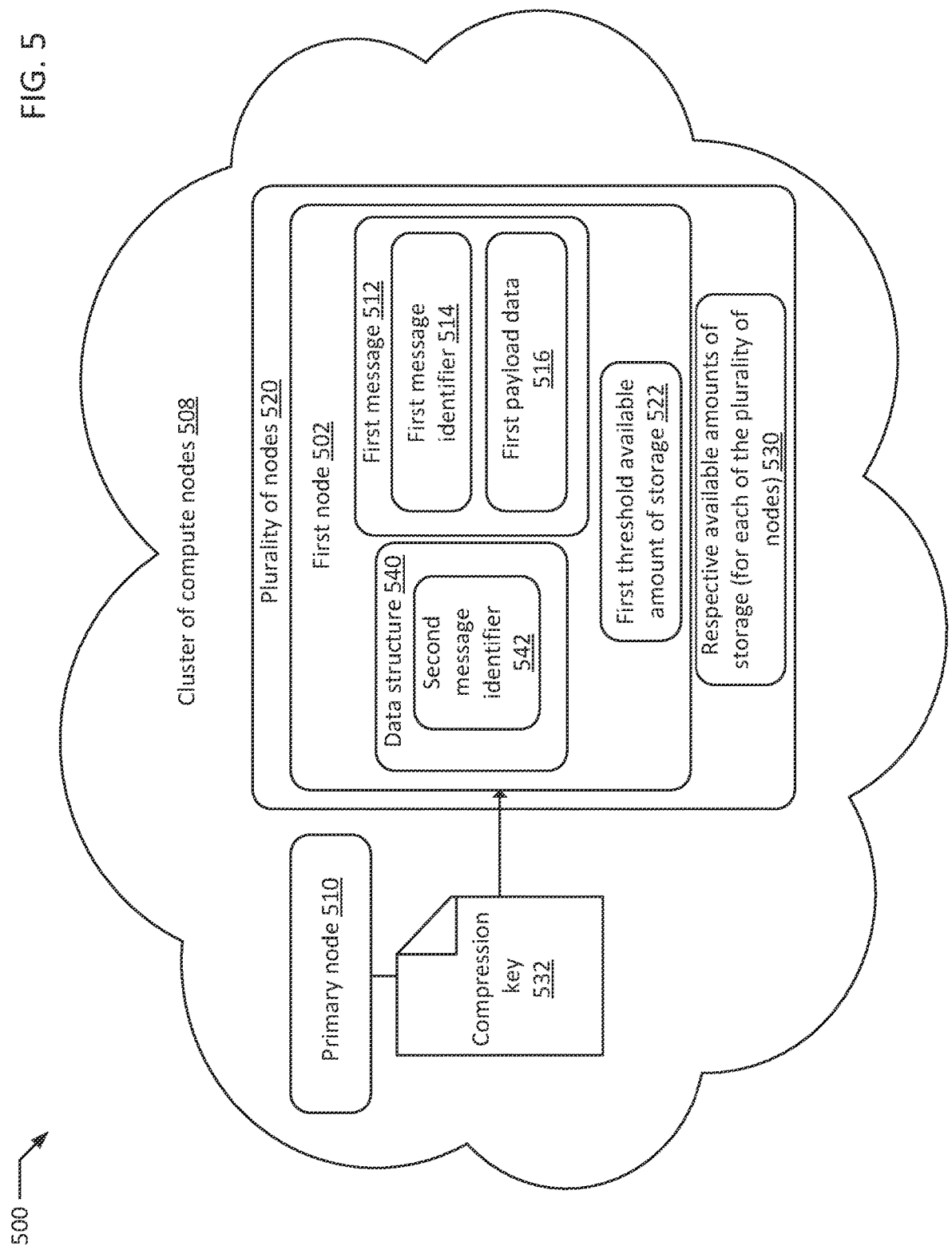
FIG. 5 is block diagram of a system configured to implement adaptive compression of a distributed, idempotent data store for a computer-messaging architecture according to an example of the present disclosure.

FIG. 5 is block diagram of a system 500 configured to implement adaptive compression of a distributed, idempotent data store for a computer-messaging architecture according to an example of the present disclosure.

The system 500 may include a cluster of compute nodes 508 including a first node 502 and a primary node 510. The first node 502 may be effective to receive a first message 512 that includes a first message identifier 514 and first payload data 516. The first message identifier 514 may uniquely identify the first message 512 from among other messages. The first payload data 516 may be the content of the first message (the data being transmitted). The first node 502 may determine respective available amounts of storage 530. The respective available amounts of storage 530 may be for each node of the plurality of nodes 520. The plurality of nodes 520 may include the first node 502. In some examples, the plurality of nodes 520 may be the nodes that store a distributed, idempotent data store, as described herein. The first node 502 may determine that the respective available amounts of storage 530 are below a first threshold available amount of storage 522.

The first node 502 may receive from the primary node 510 a compression key 532. For example, the first node 502 may send data indicating that each of the respective available amounts of storage for the nodes in the proximity table of first node 502 (e.g., plurality of nodes 520) has less than the first threshold available amount of storage 522. In response, the primary node 510 may send the compression key 532 and/or instructions to compress message identifiers to each node of the plurality of nodes 520 (including to first node 502). The first node may compress a second message identifier 542 stored in a data structure 540 using the compression key 532.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
  receiving, by a first node, a first message comprising a first message identifier and first payload data;
  determining, by the first node, that a respective available amount of storage of each node of a plurality of nodes is below a first threshold available amount of storage, wherein the plurality of nodes includes the first node;
  receiving, by the first node, a compression key from a primary node of a cluster comprising the plurality of nodes; and
  compressing, by the first node, one or more message identifiers stored in a data structure of the first node using the compression key.

2. The method of claim 1, further comprising storing the first message identifier in the data structure after compressing the one or more message identifiers using the compression key.

3. The method of claim 1, further comprising:
  sending an updated available amount of storage from the first node to the primary node;
  determining, by the primary node, that the updated available amount of storage is above the first threshold available amount of storage; and
  sending, by the primary node, instructions to decompress the message identifiers stored by the first node in the data structure.

4. The method of claim 1, further comprising:
receiving, by the first node, a second message comprising a second message identifier and second payload data, wherein the second message is addressed to a recipient device different from the first node;
sending the second message identifier to each node of the plurality of nodes; and
receiving, from a second node of the plurality of nodes, first data indicating that the second node has previously stored the second message identifier in memory, wherein the first data is effective to prevent the second message from being sent to the recipient device.

5. The method of claim 1, further comprising:
determining, by the first node, that the first message identifier is not presently stored in memory by any of the plurality of nodes; and
sending the first message to a recipient device based at least in part on the first message identifier not being presently stored in memory by any of the plurality of nodes.

6. The method of claim 1, further comprising:
receiving, by the first node, a second message comprising a second message identifier and second payload data;
determining, using a first table stored in memory of the first node, a first available amount of storage of a second node among the plurality of nodes;
sending the second message identifier to the second node;
determining that greater than a threshold amount of time has elapsed since sending the second message identifier to the second node;
determining, using the first table stored in the memory of the first node, a second available amount of storage of a third node among the plurality of nodes;
sending the second message identifier to the third node; and
receiving first data from the third node indicating that the third node has previously stored the second message identifier in memory of the third node, wherein the first data is effective to prevent the second message from being sent to a recipient device.

7. The method of claim 1, wherein the first message includes address data indicating that the first message is being sent to a first recipient device, wherein the plurality of nodes maintain a distributed idempotent data store of message identifiers, the method further comprising:
determining that the first message is a redundant message based at least in part on the first message identifier being stored by the distributed, idempotent data store; and
preventing the first message from being sent to the first recipient device.

8. The method of claim 1, further comprising:
receiving, by the first node, a second message comprising a second message identifier and second payload data;
determining, using a first table stored in memory of the first node, a first available amount of storage of a second node among the plurality of nodes, wherein the first available amount of storage is a largest available amount of storage from among nodes of the plurality of nodes;
determining, using the first table, a first amount of battery life associated with the second node of the plurality of nodes;
determining that the first amount of battery life is less than a battery life threshold; and
sending the second message identifier to a third node of the plurality of nodes.

9. The method of claim 8, further comprising:
determining, using the first table, a second amount of battery life associated with the third node; and
determining that the second amount of battery life is greater than the battery life threshold.

10. The method of claim 1, further comprising:
receiving, by the first node, a second message comprising a second message identifier and second payload data;
determining, using a first table stored in memory of the first node, a first available amount of storage of a second node among the plurality of nodes;
sending the second message identifier to the second node;
receiving, from the second node, first data indicating that the second node has stored the second message identifier;
determining, by the first node, a second available amount of storage of the second node; and
updating, by the first node, the data structure to associate the second available amount of storage with the second node.

11. The method of claim 1, further comprising setting a flag associated with the one or more message identifiers to indicate that the one or more message identifiers are compressed.

12. A system comprising:
a cluster of compute nodes comprising:
a first node; and
a primary node;
wherein the first node is effective to:
receive a first message comprising a first message identifier and first payload data;
determine that a respective available amount of storage of each node of a plurality of nodes of the cluster of compute nodes is below a first threshold available amount of storage, wherein the plurality of nodes includes the first node;
receive from the primary node a compression key; and
compress a one or more message identifiers stored in a data structure of the first node using the compression key.

13. The system of claim 12, the first node further effective to store the first message identifier in the data structure after compressing the second one or more message identifiers using the compression key.

14. The system of claim 12, the first node further effective to:
send an updated available amount of storage from the first node to the primary node; and
wherein the primary node is effective to:
determine that the updated available amount of storage is above the first threshold available amount of storage; and
send instructions to decompress the message identifiers stored by the first node in the data structure.

15. The system of claim 12, the first node further effective to:
receive a second message comprising a second message identifier and second payload data;
send the second message identifier to each node of the plurality of nodes; and
receive, from a second node of the plurality of nodes, first data indicating that the second node has previously stored the second message identifier in memory, wherein the first data is effective to prevent the second message from being sent to a recipient device.

16. The system of claim 12, the first node further effective to:
determine that the first message identifier is not presently stored in memory by any of the plurality of nodes; and
send the first message to a recipient device based at least in part on the first message identifier not being presently stored in memory by any of the plurality of nodes.

17. The system of claim 12, the first node further effective to:
receive a second message comprising a second message identifier and second payload data;
determine, using a first table stored in memory of the first node, a first available amount of storage of a second node among the plurality of nodes;
send the second message identifier to the second node;
determine that greater than a threshold amount of time has elapsed since sending the second message identifier to the second node;
determine, using the first table stored in memory of the first node, a second available amount of storage of a third node among the plurality of nodes;
send the second message identifier to the third node; and
receive first data from the third node indicating that the third node has previously stored the second message identifier in memory of the third node, wherein the first data is effective to prevent the second message from being sent to a recipient device.

18. A non-transitory machine-readable medium storing a program, which when executed by at least one processor of a first node, is effective to:
receive a first message comprising a first message identifier and first payload data;
determine that a respective available amount of storage of each node of a plurality of nodes is below a first threshold available amount of storage, wherein the plurality of nodes includes the first node;
receive a compression key from a primary node of a cluster comprising the plurality of nodes a compression key; and
compress one or more message identifiers stored in a data structure of the first node using the compression key.

19. The non-transitory machine-readable medium of claim 18, which, when executed by the at least one processor, is further effective to store the first message identifier in the data structure after compressing the one or more message identifiers using the compression key.

20. The non-transitory machine-readable medium of claim 18, which, when executed by the at least one processor, is further effective to:
send an updated available amount of storage from the first node to the primary node;
determine, by the primary node, that the updated available amount of storage is above the first threshold available amount of storage; and
send, by the primary node, instructions to decompress the message identifiers stored by the first node in the data structure.

* * * * *